United States Patent

Roth et al.

[11] Patent Number: 4,728,762
[45] Date of Patent: Mar. 1, 1988

[54] MICROWAVE HEATING APPARATUS AND METHOD

[76] Inventors: Howard Roth, 206 Devoe Ave., Yonkers, N.Y. 10705; Robert F. Schiffmann, 149 W. 88th St., New York, N.Y. 10024

[21] Appl. No.: 31,230

[22] Filed: Mar. 26, 1987

Related U.S. Application Data

[63] Continuation-in-part of Ser. No. 592,234, Mar. 22, 1984, abandoned.

[51] Int. Cl.[4] .............................................. H05B 6/64
[52] U.S. Cl. ...................... 219/10.55 E; 219/10.55 M
[58] Field of Search ................ 219/10.55 E, 10.55 R, 219/10.55 M, 432, 442; 99/323.5; 426/113, 451

[56] References Cited

U.S. PATENT DOCUMENTS

| | | | |
|---|---|---|---|
| 3,451,401 | 6/1969 | Levinson | 68/3 |
| 3,985,990 | 10/1976 | Levinson | 219/10.55 E |
| 3,985,991 | 10/1976 | Levinson | 219/10.55 E |
| 4,003,840 | 1/1977 | Ishino et al. | 219/10.55 D |
| 4,138,937 | 2/1979 | De Weese | 219/432 X |
| 4,190,757 | 2/1980 | Turpin et al. | 219/10.55 E |
| 4,220,846 | 9/1980 | Rice et al. | 219/381 |
| 4,262,183 | 4/1981 | Smith | 219/10.55 R |
| 4,289,792 | 9/1981 | Smith | 219/10.55 R X |
| 4,310,747 | 1/1982 | Rice et al. | 219/10.55 E X |
| 4,317,017 | 2/1982 | Bowen | 219/10.55 E |
| 4,338,911 | 7/1982 | Smith | 126/21 A |
| 4,362,917 | 12/1982 | Freedman et al. | 219/10.55 E |
| 4,398,077 | 9/1983 | Freedman et al. | 219/10.55 E |
| 4,409,453 | 10/1983 | Smith | 219/10.55 A |
| 4,413,167 | 11/1983 | Martel et al. | 219/10.55 E |

Primary Examiner—E. A. Goldberg
Assistant Examiner—M. M. Lateef
Attorney, Agent, or Firm—Amster, Rothstein & Ebenstein

[57] ABSTRACT

Apparatus for heating and cooking a food product with a combination of microwave heating and convection heating. A food product is placed in a chamber, and microwave energy is introduced into the chamber to heat the food product directly. A microwave absorber is exposed to microwave energy and heated thereby, and air passing over the absorber is heated and circulated within the chamber to further heat the food product.

72 Claims, 10 Drawing Figures

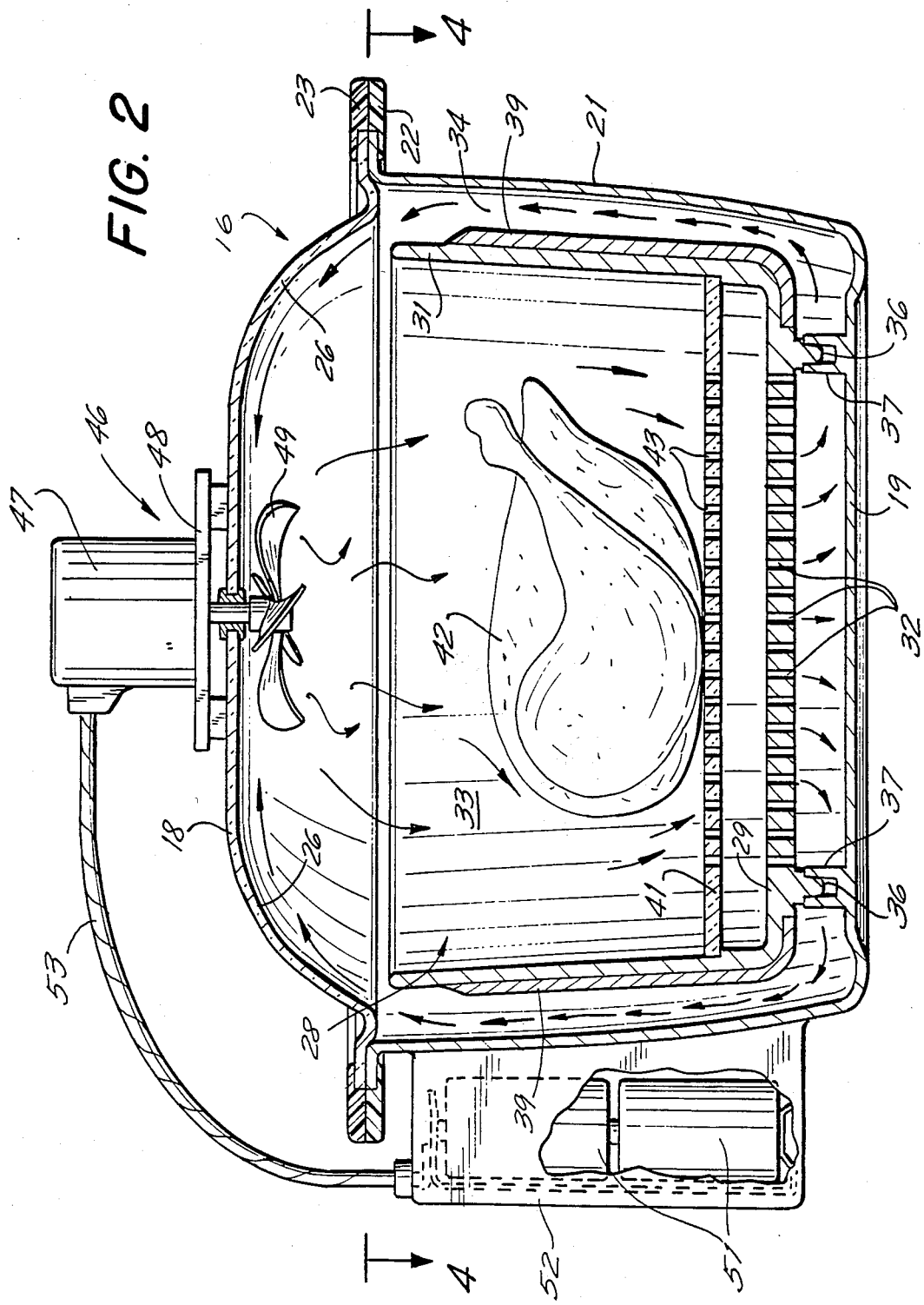

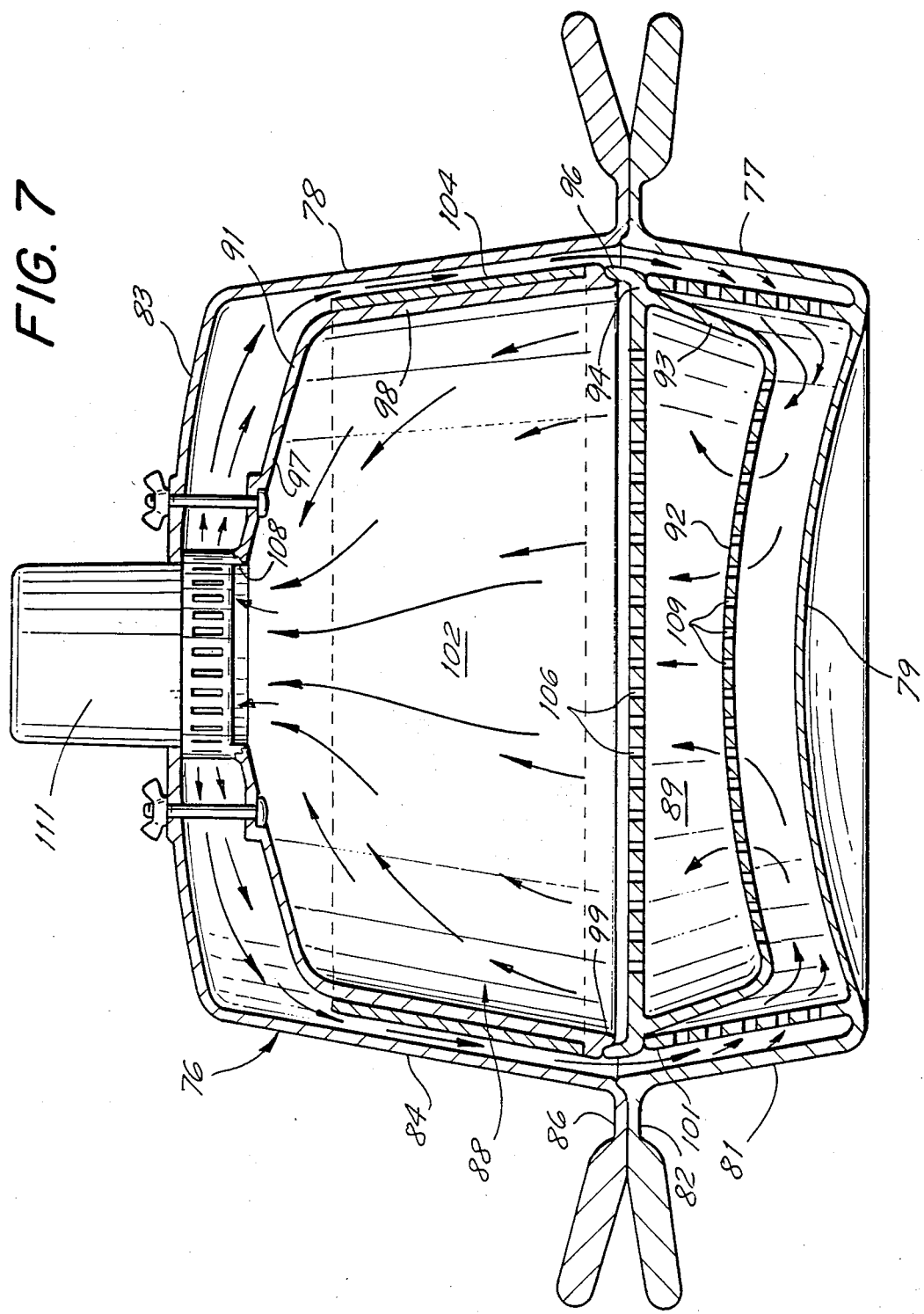

MICROWAVE HEATING APPARATUS AND METHOD

This application is a continuation-in-part of application Ser. No. 592,234, filed Mar. 22, 1984, now abandoned.

This invention pertains generally to microwave ovens, and more particularly to apparatus and a method for cooking food products by a combination of microwave heating and impinging air heating in a microwave oven.

Microwave ovens have been popular in recent years due to their ability to heat and cook many food products at a relatively rapid rate. Frozen foods can, for example, be thawed in a few minutes where it might take hours at room temperature. In addition, many foods such as certain vegetables and fish dishes are cooked both faster and without the undesirable drying effect of conventional hot air ovens.

With microwave ovens, however, there is a problem in browning the outer surface of a food product or crisping an outer crust. One solution to this problem has been to employ a two-step process in which most of the food product is cooked by microwaves and the outer surface is browned or crisped by heating in a conventional oven or broiler. This two-step technique is not desirable because it is both time consuming and wasteful of energy. Furthermore, the inability of microwave heating to dehydrate and condition the surface of a food product makes it almost impossible to cook certain food products which require a crisp crust, such as bread, in a microwave oven.

To overcome this problem, some microwave ovens have been provided with resistive heating elements and blowers to force hot air past the food product and thereby cook the food product with a combination of convection and microwave heating. One example of an oven of this type is found in U.S. Pat. No. 4,262,183. While these ovens are substantially more effective than conventional microwave ovens in browning the outer surface of a food product or forming a crisp crust, there are many microwave ovens in use that do not have this improvement.

It is in general an object of the invention to provide a new and improved apparatus and method for heating and cooking food products with microwave energy to provide a crisped, browned and more acceptable food product.

Another object of the invention is to provide an apparatus and method of the above character which provide a combination of convection and microwave heating.

Another object of the invention is to provide an apparatus of method of the above character which can be employed in existing microwave ovens.

These and other objects are achieved in accordance with the invention by placing the food product to be cooked in a chamber and introducing microwave energy into the chamber to heat the food product directly. A microwave energy absorber is also heated by the microwave energy, and air passing over the absorber and parts heated by the absorber is circulated within the chamber to further heat the food product.

FIG. 2 is a vertical sectional view of the microwave heating apparatus of FIG. 1 removed from the oven cavity.

FIG. 7 is a vertical sectional view of another embodiment of microwave heating apparatus according to the invention.

FIG. 8 is a side elevation view, in cross-section, of an insulated embodiment of the present invention.

FIG. 9 is an exploded isometric view of the insulated embodiment of FIG. 8, with the fan housing being removed for purposes of clarity of illustration.

FIG. 9A is an enlarged isometric view of a wave guide plug.

Figure 1:
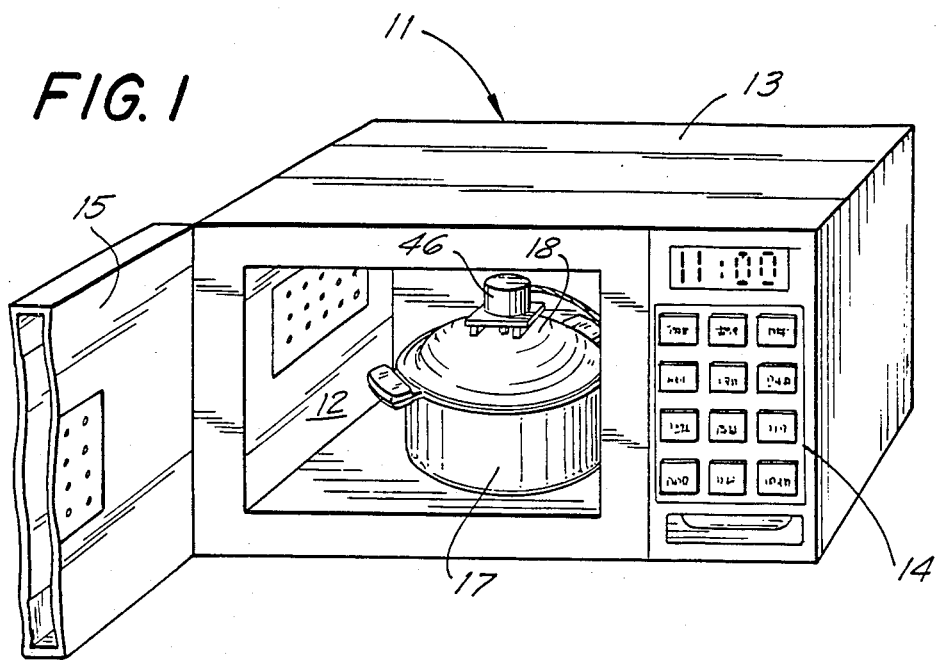
FIG. 1 is an isometric view of a microwave oven with one embodiment of microwave heating apparatus according to the invention.

In FIG. 1, the invention is illustrated in combination with a conventional microwave oven 11 having a cooking cavity 12, a cabinet 13, a control panel 14, a hinged door 15 which serves as a closure for the cooking cavity, and means (not shown) for generating microwave energy and introducing the same into the cavity.

Figure 3:
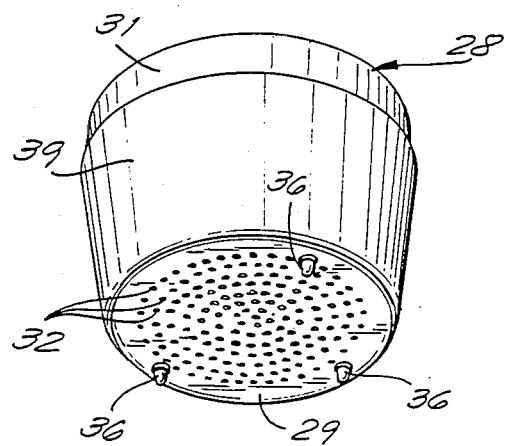
FIG. 3 is an isometric bottom view of the inner container in the apparatus of FIG. 2.

The heating apparatus of FIGS. 1-3 comprises a pot-like enclosure or outer container 16 which rests upon the floor of the oven cavity 12 and includes a body 17 and a removable cover or lid 18. Body 17 includes a generally circular bottom wall 19 and a generally cylindrical side wall 21, and cover 18 is generally domed shaped. The body and the cover have radially extending flanges 22, 23 which mate to form a substantially airtight chamber 24 within the container. Body 17 and cover 18 are each fabricated of a material which is transparent to microwave energy, and cover 18 has an inner liner 26 of microwave reflective material which limits the amount of microwave energy which enters the container.

An inner container 28 is positioned coaxially within outer container 16 and includes a generally circular bottom 29 and a generally cylindrical side wall 31 which are spaced inwardly from the corresponding walls of the outer container. The inner container is open at the top, and its bottom wall is provided with a plurality of openings 32 which are large enough to permit air to circulate freely and small enough to prevent microwave leakage. A plurality of feet 36 project from the bottom wall of the inner container and are received in locating bosses 37 on the upper side of the bottom wall of the outer container.

The side and bottom walls of inner container 28 are fabricated of a microwave reflective material such as aluminum, and an absorber 39 comprising a layer of microwave absorbant material is provided on the outer side of side wall 31. The absorber can be fabricated of any suitable material which absorbs microwave energy and is heated thereby, and suitable materials include ferrite materials having a Curie point temperature in excess of the operating temperature of the absorber. The ferrite material can be applied to the container in any suitable manner, for example, being embedded in a layer of silicone applied to the outer side of the container wall. One suitable ferrite material is Emerson Cummings CR-S124 RTV painted onto the container.

A food supporting platform 41 is mounted in inner container 28 for holding the food product 42 to be cooked. The platform is spaced above and generally parallel to the bottom wall 29 of the inner container, and it is formed with perforations or openings 43 through which air can pass freely as it circulates around the food product. The openings preferably constitute a major portion of the surface area of the platform so that the platform will not impede the circulation of the air. The platform is fabricated of a microwave transparent material, and in one presently preferred embodiment the deck of the platform comprises a Teflon glass fiber mesh.

A fan 46 is mounted on the cover 18 of the outer container above the open top of the inner container for circulating air throughout the container. The fan comprises an electrically energized motor 47 mounted on a bracket on the upper side of the lid and a fan blade 49 in the upper portion of chamber 24. The fan motor is energized by power from batteries 51 enclosed in a microwave reflective housing 52 mounted on the side wall of the outer container and connected to the motor by shielded leads 53. Alternatively, if desired, operating power for the motor can be obtained from a power circuit of the oven. With a cooking chamber having a diameter on the order of 8½ inches, the fan is designed to circulate the air at a rate of approximately 30 cfm at a velocity on the order of 100–3000 fpm, with a preferred velocity in the range of 300–1200 fpm.

The reflective inner lining 26 on cover 18 is arranged to permit only a portion of the microwave energy within the oven cavity to pass directly to food product 42. The amount of energy which is permitted to reach the food product directly is preferably between 0 and 50 percent of the available microwave energy produced by the oven, and more preferably between 5 and 25 percent of the available energy. Thus, for example, with a microwave oven having a power output of approximately 600 watts, suitable power levels for direct exposure of the food products are on the order of 25–250 watts, with levels on the order of 75–120 watts being preferred. If desired, the reflective lining can be arranged in a pattern to serve as a mask for exposing different portions of a food product to different levels of microwave energy.

Figure 4:
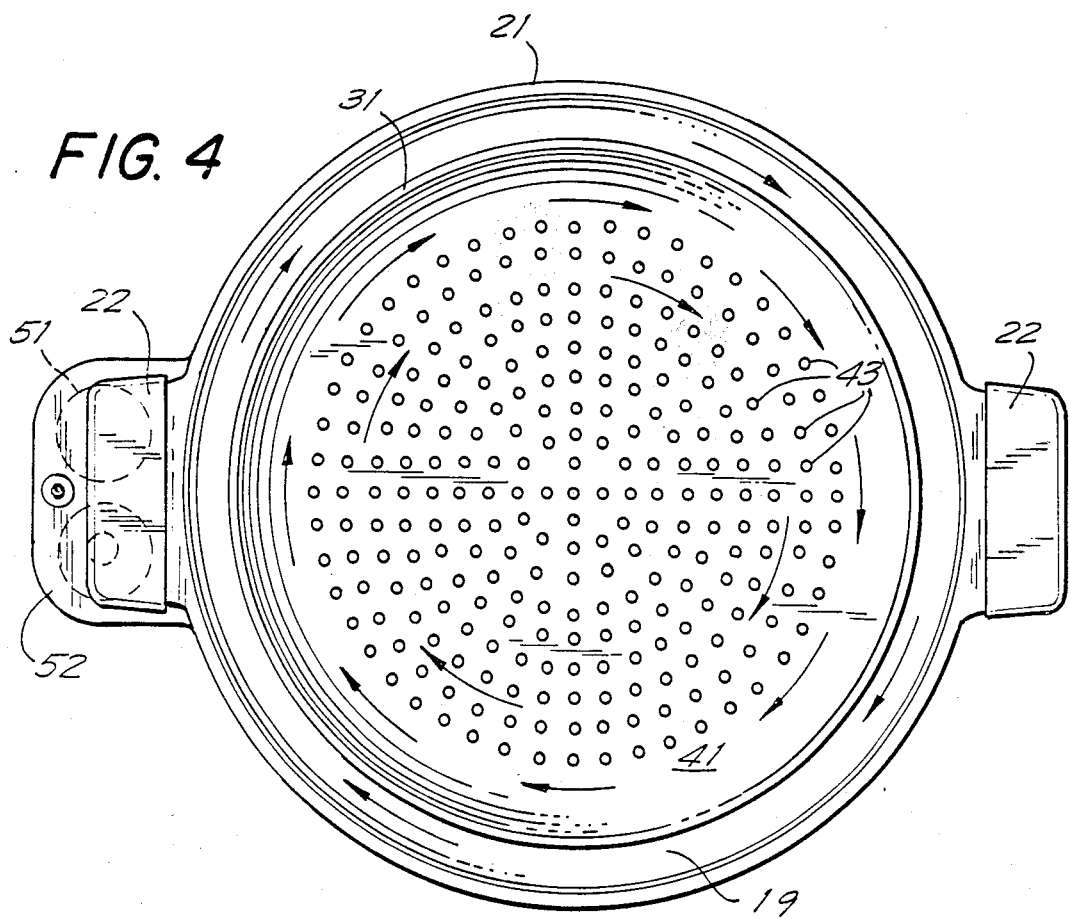
FIG. 4 is a sectional view taken along line 4—4 in FIG. 2.
Figure 5:
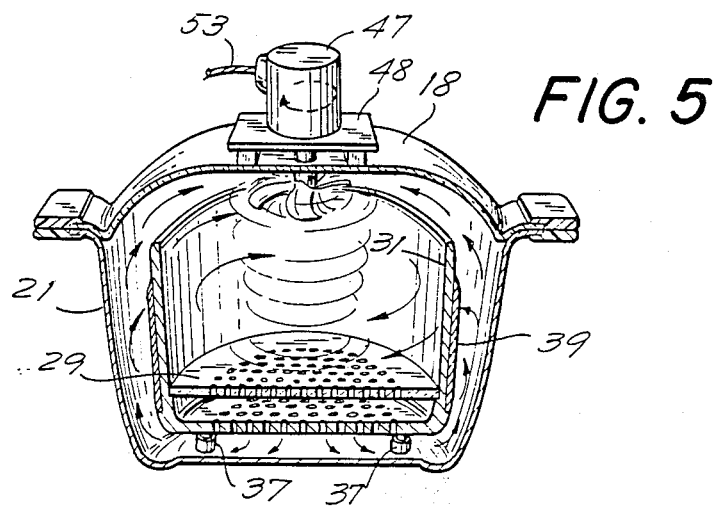
FIG. 5 is an operational view of the embodiment of FIGS. 1-4, with the food product and the food supporting platform removed for convenience in illustrating the circulation of air within the inner chamber.

Operation and use of the invention is as follows. The apparatus is placed in the cooking cavity of the microwave oven, and both the oven and the blower motor are energized. A limited portion of the microwave energy within the oven cavity passes into the interior of inner container 28 and heats food product 42 directly. Microwave energy passing through the transparent side wall of outer container 16 is absorbed by the ferrite material on the side wall 31 of the inner container, heating this material to temperatures as high as 550° F. Air within the containers is circulated in a vortex-like fashion by fan 46, as best seen in FIGS. 4 and 5. With the fan turning in a clockwise direction, as viewed from above, the air circulates downwardly and in the clockwise direction within inner container 28 and upwardly and in the clockwise direction between the chamber walls. The circulating air is heated by the absorber and by the side wall 31 of the inner container as it moves past these elements. Thus, the air is heated both in the region between the container walls and in the outer region of the inner container near side wall 31. The heated air circulating about the food product removes moisture from the outer surface of the food product to brown the surface or form a crisp crust, as desired.

The swirling or circular flow of the circulating air has been found to be particularly desirable and advantageous both from the standpoint of highly efficient and complete heat transfer from absorber 39 and side wall 31 to the air and from the standpoint of good circulation of the heated air about the food product.

With the invention operating in an oven having a power output of approximately 600 watts, air circulating at speeds on the order of 600 fpm was heated to approximately 325° F. in 6 minutes, and a ¼ pound load was heated from 0° F. to 325° F. in 10 minutes. Air circulating at these temperature and velocity levels is a highly efficient heat transfer agent which facilitates rapid cooking of food products as well as browning or crisping of the outer surface.

Table 1 illustrates the relative cooking times (in minutes) for several food products cooked with the browning apparatus of the invention and in a conventional oven.

TABLE 1

| Food | Browning Apparatus | | Conventional Oven | | Diff (%) |
|---|---|---|---|---|---|
| | Preheat | Heat | Preheat | Heat | |
| Chicken ¾ lb | none | 14 | 6 | 30–45 | 60 |
| Croissants 2 | 5 | 3–4 | 4 | 9–11 | 25 |
| Deli Sandwich | none | 10 | none | 35 | 70 |
| Fish Sticks 1 lb | none | 12 | 6 | 25 | 60 |
| French Fries ½ lb | none | 10 | 7 | 22–25 | 65 |
| Bagels 2 | 5 | 3 | 4 | 10 | 40 |
| Apple turnovers 2 | none | 14 | 8 | 25 | 58 |

In addition to the increased cooking speed, the invention was found to have an additional advantage of not drying out the food product to the extent that conventional cooking does. For example, the fish sticks had a moister interior and a crisper crust, and the french fries were plumper and not as dry as french fries cooked in a conventional oven. In addition, it was found that food products cooked in accordance with the invention lost less of their weight than similar food products prepared in a conventional oven. For example, potatoes cooked in accordance with the invention lost only 25 percent of their weight, whereas potatoes cooked in a conventional oven lost 45 percent of their weight.

Comparing the quality of food products cooked in accordance with the invention with similar products cooked in a microwave oven further illustrates the advantages of the invention. For example, chicken cooked in accordance with the invention has a crisp crust and a moist, hot interior, whereas chicken cooked in a conventional microwave oven has a soft, moist crust and a dry interior. Croissants cooked in accordance with the invention have a crisp crust and a moist, warm interior, whereas croissants cooked in a conventional microwave oven are either soggy throughout or excessively dried out, depending upon the cooking time. A frozen deli sandwich cooked in accordance with the invention has a crisp bun and a hot, moist interior, whereas a similar sandwich cooked in a conventional microwave oven has a soggy bun and a somewhat dry interior. French fried potatoes cooked in accordance with the invention have a dry, crisp outer surface and a moist, hot interior, whereas french fried potatoes cooked in a microwave oven have wet outer surfaces and a hot, moist interior. Apple turnovers cooked in accordance with the invention have a fully leavened, golden brown crust which does not collapse and a hot, moist interior, whereas similar turnovers cooked in a conventional microwave oven were only partially leavened and collapsed on cooling, with a white uncooked crust and a dry interior.

Figure 6:
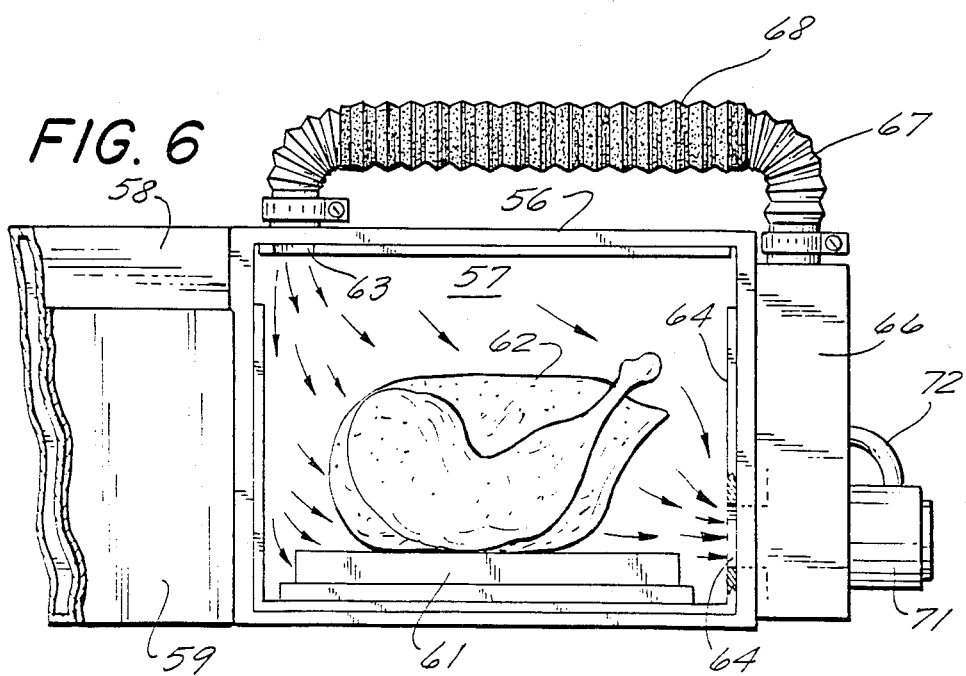
FIG. 6 is a front elevational view of another embodiment of microwave heating apparatus according to the invention.

The embodiment of FIG. 6 includes a generally rectangular cabinet 56 which rests upon the floor of the cooking cavity of a microwave oven. A chamber 57 is formed within this cabinet, and a hinged door 58 serves as a closure for the chamber. The chamber walls and door are fabricated of a material which is transparent to microwave energy, and a liner 59 comprising a plurality of microwave reflective panels on the inner sides of the walls and door limits the amount of microwave energy which can enter the chamber. The liner extends over the major portion of the walls, and in the embodiment illustrated, only a relatively small portion of the walls around the upper periphery of the cabinet is transparent to microwave energy.

A platform 61 of microwave transparent material rests on the floor of the cabinet, and a food product to be cooked in this embodiment is placed on this platform.

An air inlet opening 63 is provided in the top wall of the cabinet, and an air outlet opening 64 is provided in a side wall of the cabinet. These openings are located toward opposite corners of chamber 57, and a plenum chamber 66 is mounted on the side wall in communication with outlet opening 64. An air duct 67 extends between the plenum chamber and inlet opening 63 and provides communication between the plenum chamber and the inlet opening. The plenum chamber and the air duct are each fabricated of a material which is reflective to microwave energy, and a layer 68 of microwave absorbant material is formed on the outer wall of the air duct. In the embodiment illustrated, the air duct is formed with a corrugated side wall to maximize the area of contact and, hence, the heat transfer between the heated wall and the air within the duct. A blower 71 is mounted in the plenum chamber for circulating air through the air duct and the cooking chamber, and operating power is supplied to the blower by leads 72 from a battery pack (not shown) or a power circuit in the oven itself.

Operation and use of the embodiment of FIG. 6 is generally similar to that described above. The entire unit is placed in the cavity of a microwave oven, and a portion of the energy within the oven cavity passes directly to food product 62. The ferrite material on air duct is heated by the absorption of microwave energy within the oven cavity, and this material heats air passing through the duct to a relatively high temperature, e.g. 325° F. The heated air is circulated through chamber 57 to brown or crisp the surface of the food product in the manner discussed above. For some applications this embodiment may not be as desirable as the embodiment of FIGS. 1-5 since it does not produce the swirling or circular airflow pattern of that embodiment.

The embodiment of FIG. 7 includes an outer container 76 which has a generally circular configuration in horizontal section. This container comprises a relatively shallow base pan 77 which rests on the floor of the oven cavity, and a relatively tall lid or cover 78 which is removably mounted on the base pan. The base pan has a convex bottom wall 79 and an inclined side wall 81 which extends upwardly and outwardly from the bottom wall and terminates in a peripheral flange 82. Lid 78 comprises a top wall 83 and an inclined side wall 84 which extends downwardly and outwardly from the top wall and terminates in a peripheral flange 86 which mates with flange 82. Base 77 and lid 78 are each fabricated of a material which is transparent to microwave energy.

An inner container 88 is positioned concentrically within outer container 76 and includes a pan 89 and a lid 91 which are spaced inwardly from the pan and lid of the outer container. Pan 89 has a convex bottom wall 92, an upwardly and outwardly inclined side wall 93, an outwardly projecting annular shoulder 94 at the upper extremity of the side wall, and a cylindrical flange 96 which projects upwardly from the outer periphery of the annular shoulder. Lid 91 comprises an inclined top wall 97 and a side wall 98 which extends downwardly and outwardly from the top wall, with a generally cylindrical flange 99 at the lower edge of the side wall which mates with flange 96.

Inner pan 89 is removably mounted in the base 79 of the outer container, with flange 94 resting upon circumferentially spaced bosses 101 in the outer pan. The lid 91 of the inner container is secured to the lid of the outer container, and the two lids are removable from the base and pan as a unitary structure to provide access to the chamber 102 formed within the inner container.

The pan 89 and the side wall 98 of the lid of the inner container are fabricated of a microwave reflective material such as aluminum, and an absorber 104 similar to absorber 39 is provided on the outer side of side wall 98. The top wall 97 of lid 91 can either be fabricated of a microwave reflective material such as aluminum, or it can be made partially transparent to microwave energy, depending upon the desired degree of direct exposure of the food product to microwave energy.

The top wall of lid 91 has a central opening 108, and openings 109 are provided in the bottom wall of pan 89 to permit air to circulate freely through the inner container. A squirrel cage blower 111 is mounted on the top wall 83 of outer lid 78 above opening 108 for circulating air within the containers.

Operation and use of the embodiment of FIG. 7 is generally similar to that of the other embodiments. In this embodiment, however, somewhat greater access is provided to the food product (not shown) on platform 106 since the food product is fully exposed when the lids are removed. Also, in this embodiment, the direction of the airflow is reversed in that the squirrel cage blower draws the air in an upward direction within the inner container and discharges the air in a downward direction in the region between the inner and outer containers. The air reenters the inner container at the bottom through openings 109, and the circulating air is heated on both sides of side wall 98.

Referring now to FIGS. 8 and 9, therein illustrated is an embodiment of the present invention particularly suited for preparing foods requiring a substantial level of browning. In the embodiments of the present invention illustrated in FIGS. 1-5 and 7, the forced passage of air through the annulus between the inner and outer containers not only has the desired effect of heating the air adjacent the inner container and its microwave absorbant lining, but also the undesired effect of facilitating the escape of heat from the air adjacent the outer container into the microwave oven cavity thereabout. Thus, the food product never obtains the full beneficial browning effect theoretically made possible by the microwave absorbant material. By way of contrast, in the embodiment shown in FIGS. 8 and 9, substantially all of the heat generated by the microwave absorbant material may be maintained within the heating apparatus and available for browning.

The embodiment of FIGS. 8 and 9 includes an outer container 120 which has a generally circular configuration in horizontal section. This container comprises a base pan 122 with depending bosses 123 which rest on the floor of the oven cavity, and a relatively shallow lid or cover 124 which is removably mounted on the base pan 122. The base pan 122 has a flat bottom wall 126 and an inclined side wall 128, which extends upwardly and outwardly from the bottom wall 126 and terminates in a peripheral flange 130. Outer lid 124 comprises a relatively flat top wall 132 and an inclined side wall 134, which extends downwardly and outwardly from the top wall 132 and terminates in a peripheral flange 136 which mates with the peripheral flange 130 of the base pan 122.

An inner container 140 is positioned concentrically within outer container 120 and includes a pan 142 and a lid 144 which are spaced inwardly from the pan 122 and lid 124 of the outer container 120. Inner pan 142 has a generally flat bottom wall 146, and an inclined side wall 148 which extends upwardly and outwardly from the bottom wall 146 and terminates in a peripheral flange 150. Inner lid 144 comprises a generally flat top wall 152 and an inclined side wall 154, which extends downwardly and outwardly from the top wall 152 and terminates in a peripheral flange 156 which parallels the peripheral flange 150 of the inner pan 142.

Inner pan 142 is fixedly mounted in the base pan 122, for example, by means of inner pan flange 150. Similarly, the inner lid 144 is fixedly mounted in the outer lid 124, for example, by means of inner lid flange 156. The two lids 144, 124 forming the upper portion or cover of the apparatus are removable from the base pan 122 and inner pan 142 as a unitary composite structure to provide access to the chamber 162 formed within the inner container 140. The base pan 122 and inner pan 142 forming the lower portion or base of the apparatus are also movable as a unitary composite structure to facilitate handling and washing.

The outer container 120 (i.e., base pan 122 and outer lid 124) is fabricated of a material which is transparent to microwave energy, such as plastic, while the inner container 140 is fabricated of a microwave reflective material, such as aluminum. If desired, the inner container 140 can be made partially transparent to microwave energy, depending upon the desired degree of direct exposure of the food product to microwave energy, either by appropriate selection of the microwave reflective material or by providing openings therein.

The top walls 132, 152 of lids 124, 144 define apertures 166, in each of which is disposed internally threaded moisture-proof tubing 167 which permits the escape of steam from the heating compartment 162 into the oven cavity and the entry of microwave energy from the oven cavity into the heating compartment 162. Referring now to FIG. 9A as well, removable wave guides 168 (shown in greatly enlarged scale in FIG. 9A) are in the form of externally threaded plugs, configured and dimensioned to fit within the tubing 167 where they may, at the user's option, be disposed. As the wave guides 168 are dimensioned to preclude the passage of microwave energy directly therethrough (i.e., are "wave guides beyond cut off"), the option of using these wave guides permits the user some degree of control over the amount of microwave energy directly contacting the food product. The wave guides 168 contain small holes therethrough to permit the escape of steam from within the heating apparatus while precluding the entry of microwave energy into the heating apparatus interior.

A microwave absorber 170, similar to absorber 104, is provided on the outside of side wall 148 of the inner pan 142 and extends upwardly for about two inches from the bottom of the side wall 148. The annulus or intermediate space formed between the bottom wall 146 and side wall 148 of the inner pan 142 of the inner container 140, on the one hand, and the bottom wall 126 and side wall 128 of the base pan 122 of the outer container 120, on the other hand, is filled with thermal insulation 172. Similarly, the annulus formed between the top wall 152 and side wall 154 of the inner lid 144 of the inner container 140, on the one hand, and the top wall 132 and side wall 134 of the outer lid 124 of the outer container 120, on the other hand, is filled with insulation 174, except for the areas occupied by the moisture-proof tubing 167 and the shaft bearing 192. As represented in FIG. 9, the insulation 172 between the pan 142 and base 122 may be composed of separate side and bottom insulation pads, and the insulation 174 between the lids 124, 144 may be composed of separate side and top insulation pads. While it is not necessary that the insulation be arranged as pads, precautions must be taken to make sure that the insulation remains well distributed throughout the annulae rather than bunching up at the bottoms thereof. For example, the insulation may be glued in place with silicone cement. The thermal insulation 172, 174 is, of course, microwave transparent. The annulus containing the insulation 174 between the lids 124, 144 is sealed in water-tight fashion by the inner lid flange 156, and the annulus containing the insulation 172 between the base 122 and pan 142 is sealed in water-tight fashion by the pan flange 150. The tubing 167 and bearing 192 preclude entry of moisture into the lid annulus through openings 166.

A fan generally designated 180 is mounted on the lid composite 124, 144 for circulating air throughout the inner container 140. The fan comprises a series of batteries 182, a DC motor 184, a drive pulley 186 driven by the motor, a driven pulley 188 connected to the drive pulley 186 by means of a belt 190, and a bearing 192 extending through the outer lid 124, insulation 174 and inner lid 144. A drive shaft 194 passes through the bearing 192 and engages at its upper end with driven pulley 188 for rotation therewith and terminates at its lower end in fan blade 196 within inner container 140. The motor 184 and the batteries 182 energizing the same are enclosed in a microwave reflective housing 189 mounted on the outer lid 124 of the outer container 120. Alternatively, if desired, operating power for the motor can be obtained from the power circuit of the oven.

Operation and use of the embodiment of FIGS. 8 and 9 is generally similar to that of the other embodiments. In this embodiment, however, air flow is essentially circular within the inner container 140. Accordingly, while there is some loss in the efficiency of heating the air because the air flow is not passing directly over the microwave absorber 170, the heated air is isolated from the lower temperatures of the microwave oven by means of the insulation 172, 174, for a net gain in thermal energy and temperature for the air current reaching the food. Accordingly, with this embodiment most frozen foods can be taken from the frozen state to the browned and cooked state in 15 minutes or less. Similarly, the temperature of the cooking compartment 162 may be raised in a common home microwave oven having 600 watts of power to 400° F. in less than two minutes. The rapid heating serves to insure that water on the outside of the food product is rapidly evaporated off before it and moisture inside the food product has an opportunity to migrate into the forming crust.

The insulation provides the additional advantage of maintaining a temperature differential between the outer container 120 and the microwave energy absorber 170, so that the outer container is not limited to manufacture from plastics capable of withstanding the elevated temperature (generally over 600° F.) reached by the absorber during normal operations.

Obviously the microwave energy absorber or susceptor must be capable of absorbing microwave energy at whatever temperatures the absorber is expected to function within the device of the present invention. As adsorbers substantially stop absorbing microwave energy at or above their Curie point temperature, the absorber must be of material which either does not have a Curie point temperature, such as iron powder and carbon, or has a Curie point temperature exceeding the operating temperature of the absorber, such as some ferrites. While the absorber operating temperature will vary with the particular applications of the present invention, generally absorbers useful in the present invention have a Curie point temperature in excess of 600° F. A preferred powdered iron absorber is Eccosorb CRS 124.

In order to achieve the desired rapid heating of the air current, the quantity and geometry of the microwave absorber 170 are significant aspects of the present invention. For the common home microwave oven having from 400 to 700 watts of power, 64 to 96 grams of ferrite microwave absorber have been found desirable, although for ovens of greater wattage the amount of ferrite may be increased proportionately. If too little ferrite is employed, the coupling between the microwave energy and the ferrite is inefficient. If too much ferrite is used, the microwave energy is used up in heating the mass of the ferrite, and the ferrite does not reach the desired high temperature. The ferrite is preferably applied in the form of a paint of lacquer of 80% ferrite and 20% by weight silicone binder. Higher percentages of ferrite interfere with the formation of a well defined integral coating of absorbant material on the inner container surface, while lower percentages result in a reduced efficiency of coupling between the ferrite and the microwave energy. It has been found experimentally that a two-inch wide band of the above described ferrite/silicone mixture painted at a thickness of 0.05 inch provides optimum coupling efficieny. The band is painted on the outside circumference of the inner pan side wall 148, starting at the bottom edge. If the band is wider than two inches, the paint layer becomes too thin for optimum coupling efficiency. The band starts at the bottom edge of the side wall 148 because heated air rises and will actually warm the upper portions thereof.

The air current velocity is preferably at least 800 linear feet per minute, with 1200 feet per minute being a preferred velocity. A battery-operated low powered DC motor and fan is capable of providing suitable flow rates for containers having cooking compartment volumes of 100–300 cubic inches, preferably 250 cubic inches. In order to avoid dead spots within the cooking chamber 162 where the air does not flow, the cooking chamber should optimally be a vertical cylinder or truncated cone so that the planes parallel to the fan blades are circular. Generally as high a linear flow rate as possible is desired in order to obtain rapid removal of mositure from the food product surface; however, the flow rate must be maintained below that at which the food is broken apart or crumbled by the air current.

In the event that the browning or sensible heating is occurring too efficiently, with an insufficient amount of direct cooking of the food product by the microwave energy within the limited time available (before burning rather than browning occurs), the heating apparatus may be modified to provide a higher degree of direct food cooking by microwave energy relative to the browning. In this way, the heating apparatus can accommodate different food products which require different combinations of microwave and sensible heating. The lid composite 124, 144, 174 may be spaced above the pan/base composite 122, 142, 172 by the use of $\frac{1}{4}$ to $\frac{3}{8}$ inch plastic ring separators (not shown). This solution allows additional microwave energy to enter the cooking compartment 162, thus increasing microwave cooking and decreasing sensible cooking. alternatively, as illustrated in FIGS. 8 and 9, the diameter of the tubing 167 through the lid composite 124, 144, 174 may be sufficient not only to allow for the escape of moisture, but also to allow the entry of microwave energy therethrough (and in particular through the top wall 152 of the inner container 140) into the cooking compartment 162. Furthermore, the large diameter tubing 167 may be internally threaded and adapted to receive externally threaded plugs 168 (see FIG. 9A) comprising waveguides beyond cutoff, these being plugs effective to allow the passage therethrough of moisture, but not microwave energy. Thus the user of the heating apparatus, depending upon the food product being cooked, could easily insert the plugs 168 in order to achieve a higher level of browning and just as easily remove the plugs 168 in order to achieve a lower level of browning.

As in the case of the other embodiments, a suitable food supporting platform, similar to food supporting platform 41, may be mounted on the bottom wall 146 of the inner pan 142 to support the food product thereabove, thereby allowing the hot air current to contact the bottom of the food product.

The invention has a number of important features and advantages. It permits food products to be cooked rapidlY and with improved quality compared to conventional hot air ovens and conventional microwave ovens. The apparatus is constructed as a unitary structure which can be utilized with existing microwave ovens, and it is readily removed from the oven cavity and disassembled for cleaning when necessary. In addition, it has been found to provide relatively uniform cooking without the need for rotating or turning the food product as it cooks. This latter advantage is believed to be due to the relatively low power level employed for direct microwave heating and the relatively large surface areas involved.

It is apparent from the foregoing that a new and improved apparatus and method for heating with microwave energy have been provided. While only certain presently preferred embodiments have been described in detail, as will be apparent to those familiar with the art, certain changes and modifications can be made without departing from the scope of the invention as defined by the following claims.

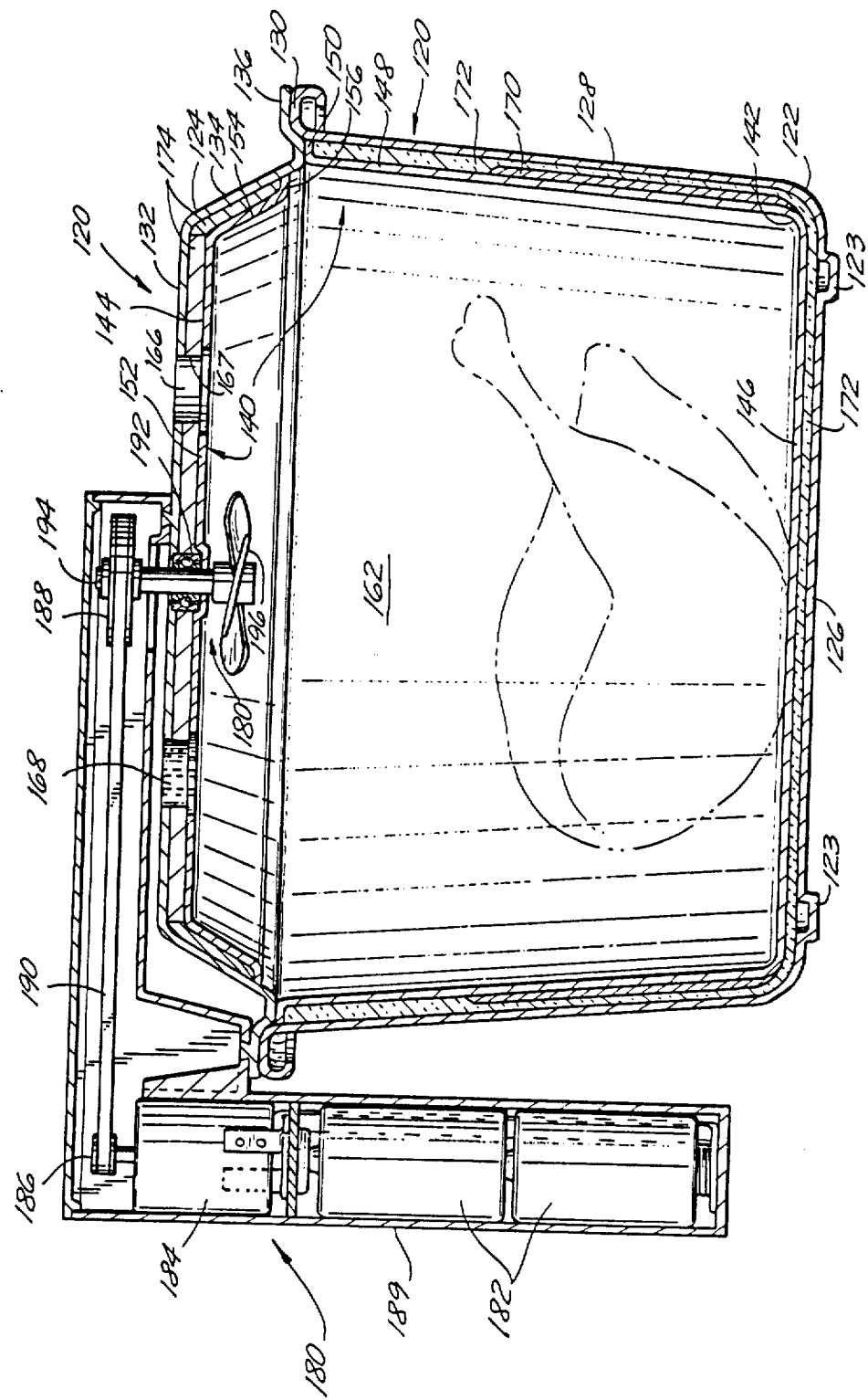

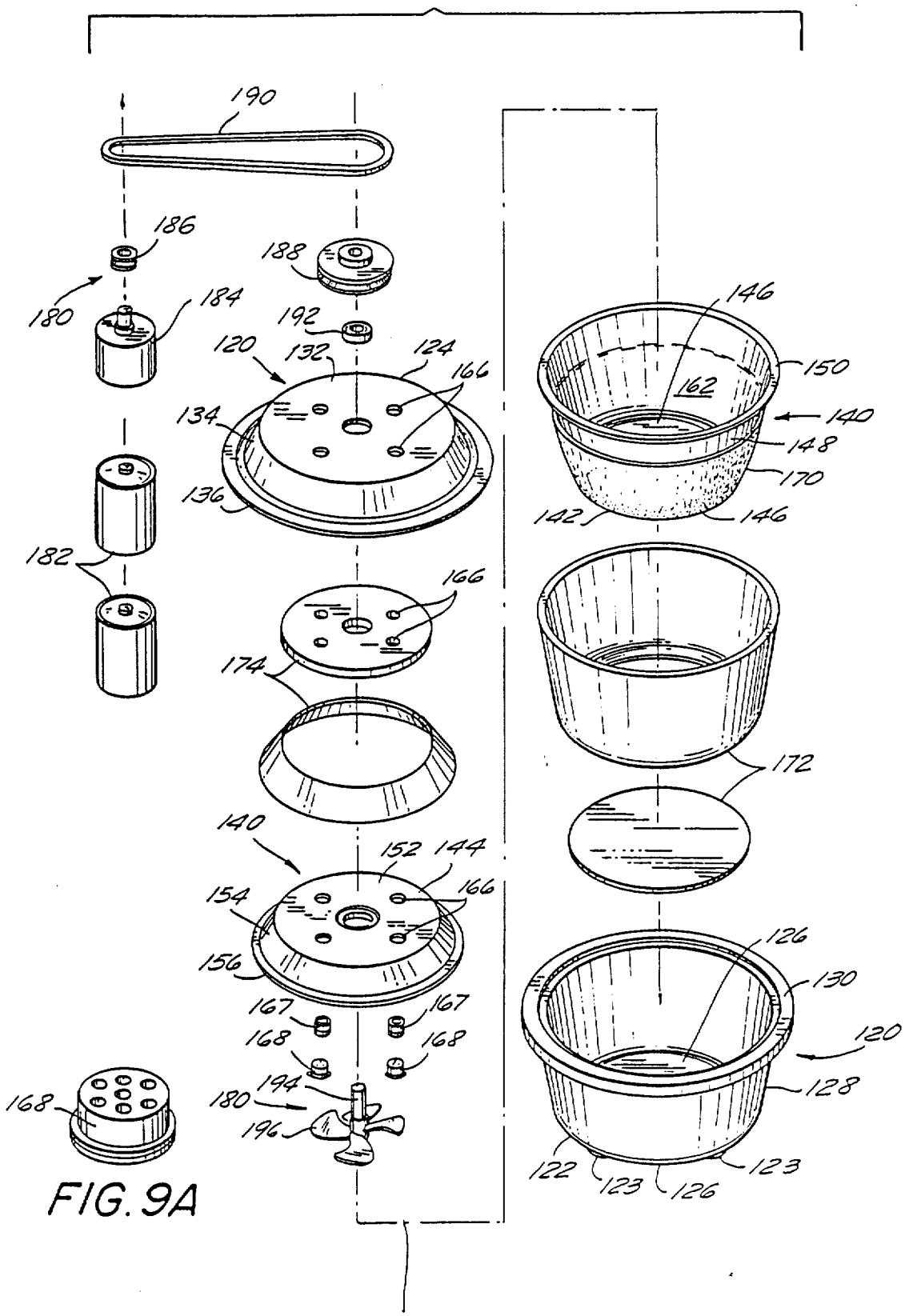

We claim:

1. In an apparatus for use with a source of microwave energy for heating and cooking a food product: a chamber in which the food product is placed, means for introducing no more than about 25 percent of the microwave energy from the source into the chamber to heat the food product directly and preventing the remainder of the microwave energy from entering the chamber, a microwave energy absorber capable of being exposed to the microwave energy for heating air near the absorber, and means for circulating the heated air around the food product to further heat the product.

2. The apparatus of claim 1 including a platform through which the heated air can pass freely for supporting the food product in the chamber.

3. The apparatus of claim 2 wherein the platform is fabricated of a material which is transparent to microwave energy.

4. The apparatus of claim 1 wherein the source of microwave energy comprises a microwave oven having a heating cavity, and the apparatus constitutes a unitary structure which can be inserted into and removed form the heating cavity of the oven.

5. The apparatus of claim 1 wherein the microwave energy absorber comprises a ferrite material.

6. The apparatus of claim 5 wherein the ferrite material has a Curie point temperature in excess of its operating temperature.

7. The apparatus of claim 1 wherein the absorber has a relatively large surface area to maximize heat transfer between the absorber and the air passing over the same.

8. The apparatus of claim 1 wherein the means for introducing a portion of the microwave energy into the chamber includes means for controlling the amounts of energy reaching different parts of the food product.

9. The apparatus of claim 1 wherein the means for circulating the heated air comprises an electrically energized fan.

10. The apparatus of claim 9 including a battery connected to the fan for supplying operating power to the same.

11. In apparatus for heating and cooking a food product with microwave energy: a chamber in which the food product is placed formed by a closed outer container fabricated of a material at least partially transparent to microwave energy and an inner container having an open top and bottom and side walls spaced from the corresponding walls of the outer container, the inner container having a bottom wall and being formed at least in part of a material capable of absorbing microwave energy and being heated thereby, means for introducing a portion of the microwave energy into the chamber to heat the food product directly, and means comprising a fan positioned above the open top of the inner container for circulating air rapidly in a circular pattern past the heated portion of the inner container and about the food product to effect a high degree of heat transfer from the heated container to the outer surface of the food product.

12. The apparatus of claim 11 wherein the inner container has a layer of ferrite material on the outer side wall thereof.

13. The apparatus of claim 11 wherein the inner container is fabricated of a material which reflects microwave energy.

14. In apparatus for heating and cooking a food product with microwave energy: a chamber in which the food product is placed including an enclosure positioned within the cooking cavity of a microwave oven, said enclosure having at least one microwave transparent portion through which a portion of the microwave energy can enter the chamber to heat the food product directly, air inlet and outlet openings in the enclosure, an air duct interconnecting the inlet and outlet openings outside the enclosure and inside the oven cavity, said air duct being fabricated at least in part of a microwave absorbant material which is heated by the microwave energy and serves to heat air passing through the duct, and blower means for circulating air through the duct and the chamber.

15. The apparatus of claim 14 wherein the enclosure has a wall of microwave transparent material with an inner layer of microwave reflective material extending over at least a portion of the wall.

16. The apparatus of claim 14 wherein the air duct is fabricated of a microwave reflective material with a layer of microwave absorbant material on the outer wall of the duct.

17. The apparatus of claim 14 wherein the microwave absorbant material is a ferrite material.

18. The apparatus of claim 17 wherein the ferrite material has a Curie point temperature excess of its operating temperature.

19. The apparatus of claim 14 in which the air duct has a corrugated wall to maximize the heating of air passing through the duct.

20. Apparatus for heating a food product in the cavity of a microwave oven, comprising: an outer container fabricated at least in part of a material transparent to microwave energy and having a generally cylindrical side wall, a bottom wall which rests on the floor of the oven cavity, and a removable cover; an inner container fabricated of a microwave reflective material positioned coaxially within the outer container and having an open top, a side wall spaced from the side wall of the outer container, and a bottom wall spaced from the bottom wall of the outer container; microwave absorbant material on the outer side wall of the inner container for absorbing microwave energy and heating air in the region of the side wall of the inner container, and fan means positioned above the open top of the inner container for circulating the heated air through the inner container whereby a food product placed in the inner container is heated by a combination of microwave energy and heated air.

21. The apparatus of claim 20, including a platform through which the circulating air can pass for holding the food product in the inner container.

22. The apparatus of claim 21 wherein the platform is fabricated of a material which is transparent to microwave energy.

23. The apparatus of claim 20 wherein the microwave absorbing material comprises a ferrite material.

24. The apparatus of claim 23 wherein the ferrite material has a Curie point temperature excess of its operating temperature.

25. The apparatus of claim 20 wherein the fan means comprises an electrically operated fan mounted on the removable cover of the outer container.

26. The apparatus of claim 25 including a battery for supplying operating power for the fan.

27. The apparatus of claim 20 wherein the outer container and the inner container permit only a portion of the microwave energy within the oven cavity to reach the food product.

28. Apparatus for heating a food product in the cavity of a microwave oven, comprising: an enclosure which is partially transparent to microwave energy which rests in the oven cavity and forms a cooking chamber for the food product, air inlet and outlet openings in the enclosure, an air duct interconnecting the inlet and outlet openings outside the enclosure, said air duct being fabricated at least in part of a microwave absorbant material which is heated by the microwave energy and heats air passing through the duct, and blower means for circulating air through the duct and the cooking chamber whereby a food product in the chamber is heated by a combination of microwave energy and the heated air.

29. The apparatus of claim 28 wherein the enclosure comprises a generally rectangular cabinet having walls fabricated of a microwave transparent material with an inner lining of microwave reflective material extending over portions of the walls.

30. The apparatus of claim 28 wherein the air duct is fabricated of a microwave reflective material with a layer of microwave absorbant material on the outer wall of the duct.

31. The apparatus of claim 30 wherein the microwave absorbant material is a ferrite material.

32. The apparatus of claim 31 wherein the ferrite material has a Curie point temperature in excess of its operating temperature.

33. The apparatus of claim 28 wherein a plenum chamber is mounted on a wall of the enclosure adjacent to the outlet opening and in communication with the air duct, and the blower means comprises a fan mounted in the plenum chamber.

34. The apparatus of claim 28 wherein the air duct has a corrugated side wall to maximize the transfer of heat to air passing through the duct.

35. In a method of heating a food product with microwave energy, the steps of: placing a chamber in a cavity of a microwave oven, placing the food product in the chamber, introducing no more than about 25 percent of the microwave energy generated by the oven into the chamber to heat the food product directly, heating a microwave absorber with a protion of the remainder of the microwave energy, passing air near the absorber to heat the air, and blowing the air through the chamber to further heat the food product.

36. The method of claim 35 wherein the food product is held in a stationary position.

37. The apparatus of claim 1 wherein the chamber is thermally insulated.

38. In apparatus for heating and cooking a food product with microwave energy: a chamber in which the food product is placed formed by a closed outer container fabricated of a material at least partially transparent to microwave energy and a closed inner container having a top, bottom and side walls spaced from the corresponding walls of the outer container to define an annulus, the inner container being formed at least in part of a material capable of absorbing microwave energy and being heated thereby, means for introducing a portion of the microwave energy into the inner container to heat the food product directly, and means comprising a fan positioned within the inner container for circulating air past the heated portion of the inner container and about the food product to effect a high degree of heat transfer from the heated portion of the inner container to the outer surface of the food product.

39. The apparatus of claim 38 wherein the inner container has a layer of ferrite material on the outer side wall thereof.

40. The apparatus of claim 38 wherein the inner container is fabricated of a material which reflects microwave energy.

41. The apparatus of claim 38 wherein heat insulation is disposed in the annulus to minimize heat transfer from the inner container through the outer container.

42. The apparatus of claim 38 additionally comprising vent tubing extending through both of the tops for the escape from the apparatus of steam produced in the inner container.

43. The apparatus of claim 42 wherein the top of the inner container includes means for controlling the introduction of microwave energy into the inner container through the top thereof to regulate the ratio of the microwave energy heating the food product directly and the microwave energy being absorbed by and heating the inner container.

44. The apparatus of claim 38 wherein thermal insulation is disposed in the space intermediate the top, bottom and side walls of the inner containers and the corresponding walls of the outer container to minimize heat transfer from the inner container through the outer container.

45. The apparatus of claim 38 wherein the upper portions of the walls of the inner container and the upper portions of the corresponding walls of the outer container are a unitary structure movable as a unit together, and the lower portions of the walls of the inner container and the lower portions of the corresponding walls of the outer container are a unitary structure movable as a unit together.

46. The apparatus of claim 38 wherein said material capable of absorbing microwave energy and being heated thereby is a material characterized by an absence of any Curie point temperature below 600° F.

47. Apparatus for heating a food product in the cavity of a microwave oven, comprising: an outer container fabricated at least in part of a material transparent to microwave energy and having a generally cylindrical side wall, a bottom wall supported by the floor of the oven cavity, and a removable cover; an inner container fabricated of a microwave reflective material positioned coaxially within the outer container and having a side wall spaced from the side wall of the outer container, a bottom wall spaced from the bottom wall of the outer container, and a removable cover spaced from the removable cover of the outer container; a layer of microwave absorbant material on the outer side wall of the inner container for absorbing microwave energy and heating air in the region of the side wall of the inner container; and fan means positioned within the inner container adjacent the removable cover thereof for circulating the heated air through the inner container whereby a food product placed in the inner container is heated by a combination of microwave energy and heated air; and thermal insulation disposed in the space intermediate the side walls, bottom walls and removable covers of the inner and outer containers, respectively, to minimize heat loss from the inner container through the outer container.

48. The apparatus of claim 47 including a platform through which the circulating air can pass for holding the food product in the inner container.

49. The apparatus of claim 47 wherein the platform is fabricated of a material which is transparent to microwave energy.

50. The apparatus of claim 47 wherein the microwave absorbing material comprises a ferrite material.

51. The apparatus of claim 50 wherein the ferrite material has a Curie point temperature in excess of 600° F.

52. The apparatus of claim 47 wherein the fan means comprises an electrically operated fan mounted on the removable cover of the inner container.

53. The apparatus of claim 52, including a battery for supplying operating power for the fan.

54. The apparatus of claim 47 wherein the inner container permits only a portion of the microwave energy within the oven cavity to reach the food product.

55. The apparatus of claim 47 wherein the removable covers have vents for the escape of steam from the inner container.

56. The apparatus of claim 47 wherein the removable cover or the inner container has means for the controlled leakage of microwave energy through the removable cover into the inner container to regulate the relative heating of the food product by microwave energy and heated air.

57. The apparatus of claim 47 wherein the covers are a unitary structure movable as a unit together, and the bottom walls and side walls are a unitary structure movable as a unit together.

58. The apparatus of claim 47 wherein the microwave absorbing material is iron powder or carbon.

59. The apparatus of claim 47 wherein the microwave absorbing material is charaterized by the absence of a Curie point temperature below 600° F.

60. The method of claim 38 wherein the food product is placed in a thermally insulated chamber.

61. The apparatus of claim 38 further including as the source of microwave energy a microwave oven defining a cavity, the chamber being disposed within the cavity.

62. The apparatus of claim 1 wherein the chamber includes means for varying the amount of microwave energy being introduced into the chamber from the source.

63. In an apparatus for use with a source of microwave energy for heating and cooking a food product: a chamber for receiving the food product, means for introducing a portion of the microwave energy from the source into the chamber to heat the food product directly and preventing the remainder of the microwave energy from entering the chamber, a microwave energy absorber capable of being exposed to the microwave energy for heating air near the absorber, and means for circulating the heated air around the food product to further heat the product.

64. The apparatus of claim 63 wherein the portion of the microwave energy introduced into the chasmber to heat the food product directly is on the order of 5–25 percent of the microwave energy available.

65. The apparatus of claim 63 including a closed outer container fabricated of a material at least partially transparent to microwave energy, the chamber comprising an inner container having an open top and bottom and side walls spaced from the corresponding walls of the outer container, the inner container having a bottom wall and being formed at least in part of a material capable of absorbing microwave energy and being heated thereby; and the circulating means comprising a fan positioned above the open top of the inner container for circulating air rapidly in a circular pattern past the heated portion of the inner container and about the food product to effect a high degree of heat transfer from the heated portion of the inner container to the outer surface of the food product.

66. The apparatus of claim 63 further including as the microwave energy source a microwave oven defining a cavity, the chamber being disposed within the cavity.

67. The apparatus of claim 63 including an enclosure positioned within the cooking cavity of a microwave oven, said enclosure having at least one microwave transparent portion through which a portion of the microwave energy can enter the chamber to heat the food product directly, air inlet and outlet openings in the enclosure, an air duct interconnecting the inlet and outlet openings outside the enclosure and inside the oven cavity, said air duct being fabricated at least in part of a microwave absorbant material which is heated by the microwave energy and serves to heat air passing through the duct, and blower means for circulating air through the duct and the chamber.

68. In a method of heating a food product disposed in a chamber located in the cavity of a microwave oven having a source of microwave energy, the steps of: introducing a portion of the microwave energy into the chamber to heat the food product directly while preventing the remainder of the micorwave energy from entering the chamber, exposing a microwave absorber outside of the chamber to at least some of the remainder of the microwave energy preventing from entering the chamber to heat the microwave absorber, passing air near the microwave absorber to heat the air, and circulating the air within the chamber to further heat the food product.

69. The method of claim 68 wherein the food product is placed in a thermally insulated chamber.

70. The method of claim 68 wherein the portion of the microwave energy introduced into the chamber to heat the food product directly is on the order of 5–25 percent of the microwave energy available.

71. The apparatus of claim 38 wherein the portion of the microwave energy introduced into the chamber to heat the food product directloy is on the order of 5–25 percent of the microwave energy available.

72. The apparatus of claim 38 wherein said fan means is adapted to circulate air rapidly in a circular pattern within the inner container.

* * * * *

UNITED STATES PATENT AND TRADEMARK OFFICE
CERTIFICATE OF CORRECTION

PATENT NO. :     4,728,762                            Page 1 of 3
DATED      :     March 1, 1988
INVENTOR(S) :    Howard Roth, et al.

It is certified that error appears in the above-identified patent and that said Letters Patent is hereby corrected as shown below:

Figs. 8, 9 and 9A of the drawings should be added as shown on the attached sheet.

Signed and Sealed this

Fourth Day of December, 1990

*Attest:*

HARRY F. MANBECK, JR.

*Attesting Officer*  *Commissioner of Patents and Trademarks*